Jan. 24, 1967  L. FRANKLIN  3,300,317

METHOD OF PREPARING A FOWL PRODUCT

Filed Feb. 5, 1964

INVENTOR
LEO FRANKLIN

BY *Beale and Jones*

ATTORNEYS

United States Patent Office 3,300,317
Patented Jan. 24, 1967

3,300,317
METHOD OF PREPARING A FOWL PRODUCT
Leo Franklin, 1300 N. 15th St., Harrisburg, Pa. 17103
Filed Feb. 5, 1964, Ser. No. 342,728
5 Claims. (Cl. 99—107)

This invention relates to a stuffed fowl product and the method of making it, and more particularly to a fowl product including a stuffed wing and/or breast which preferably are attached to each other. This invention has proven to be especially well adapted to the breasts and wings of chickens, but its employment with other fowl such as turkeys is contemplated. Any suitable stuffing material, including breaded stuffings, meats and cheeses may be used in preparing this product.

It is, of course, common practice to place stuffing materials within edible meats; for example, the filling of the body cavity of an eviscerated turkey with a breaded stuffing, or the slicing of meat chops so that they may be filled with a stuffing material.

Various attempts have been made in the past to stuff the breasts of chicken, much in the same manner in which meat chops are stuffed. These prior art methods, while capable of producing a palatable dish, generally limit the manner in which the product may be cooked to broiling and similar methods in which the product may be held relatively stationary, sometimes in a mold, to prevent the stuffing from falling out.

Some commercial systems for rapidly frying chicken involve the use of a pressurized cooking chamber. This naturally places a large amount of pressure on the exterior surfaces of each piece of chicken. When a stuffed piece of chicken is fried by such a process the pressure will cause the stuffing material to be forced out of the chicken.

It is an object of this invention to produce a stuffed chicken breast which retains the stuffing material, even when fried under superatmospheric pressure.

Another object is to provide a novel method of combining the wing and breast of a chicken in a manner so that the edible portions of both may be filled with a stuffing material.

Still another object is to produce a most palatable food product which is conveniently prepared and easily handled both by those cooking and those eating the product.

A further object is to provide a novel method of inserting a boned fowl wing into the breast in a manner so that the wing serves as a sack for a stuffing material.

The satisfaction of these and other objects may be more readily understood after a study of the following specification and the drawings wherein.

Figure 1:
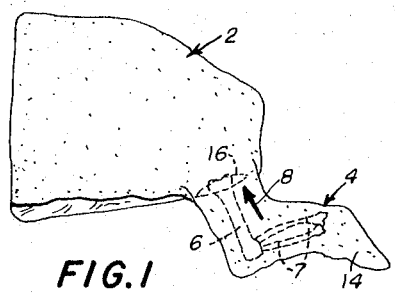
FIG. 1 is a view of a boned chicken breast which has a wing attached thereto.

In the practice of this invention, the unitary breast and wing portion is preferably removed from the chicken, and the various bones in the breast portion, including the ribs, scapula, coracoid, clavicle and furculum are removed therefrom. After the breast has the bones removed, the product will appear as shown in FIG. 1. The boned breast 2 is a generally flat piece of flesh having breast skin covering one side. The skin side of the left breast is shown in FIG. 1.

Figure 2:
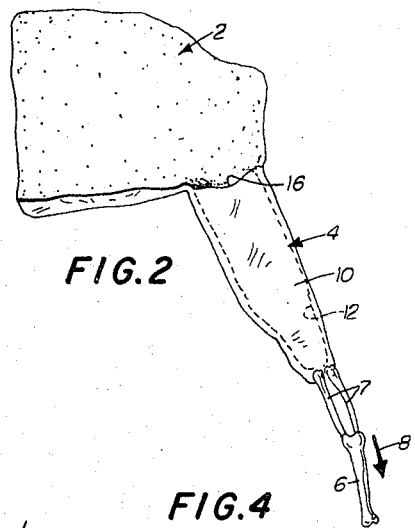
FIG. 2 shows the bones being removed from the chicken wing.

Next, the bones are removed from the wing 4 without substantially severing the wing flesh. The end of the humerus bone 6 is exposed at the flesh side of the breast, and it is pulled in the direction indicated by arrow 8 in FIG. 1. As the bone 6 is withdrawn, it carries with it the two smaller wing bones 7, the ulna and radius. Due to the intimate connection between the bones and the wing flesh, it is necessary to cut or scrape the flesh from the bones, especially at the joints. Withdrawal of the bone in this manner will cause the wing to invert by turning inside out as shown in FIG. 2 so that the wing flesh 10 is exposed and the wing skin 12 is located on the interior of the wing. The wing tip portion 14 has so little flesh, that it cannot be turned inside out and will usually break off when the bones 6 and 7 are pulled. The boned wing portion has a central cavity, is generally tubular, and the flesh thereof remains substantially unsevered.

Figure 3:
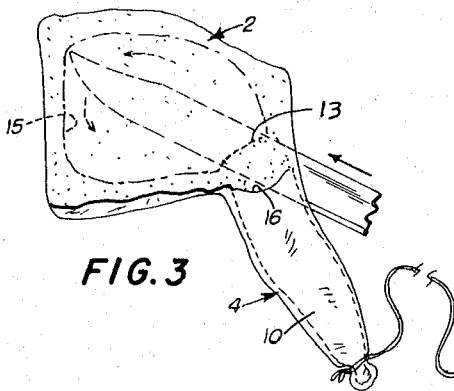
FIG. 3 shows an incision being made in the breast and the formation of a cavity within the breast.

The next step, shown in FIG. 3, is to make an opening or incision 13 in the flesh side of the breast 2, relatively close to the point where the wing attaches to the breast. Through this incision 13, a pocket or cavity 15 is formed within the walls of the breast by moving the knife in a plane generally parallel to the sides of the breast. It will be noted that the opening 16 in the wing lies on the side of the wing which corresponds to the skin side of the breast.

Next, the wing is drawn through incision 13 into the breast cavity. This may be done in various manners. As shown, this is accomplished by tying a threaded needle 18 to the end portion of the boned wing. The needle is inserted through the incision 13, passed through the breast cavity, and out through the edge wall of the breast. The string is drawn to pull the wing into the position shown in FIG. 4. In practice, the end of the wing may be pulled through the edge wall of the breast, the string detached, and the end of the wing tucked back inside the breast.

Figure 4:
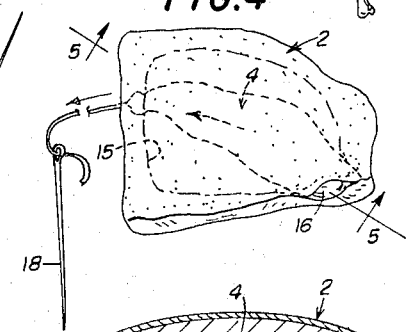
FIG. 4 shows the boned wing being drawn into the cavity in the breast.
Figure 5:
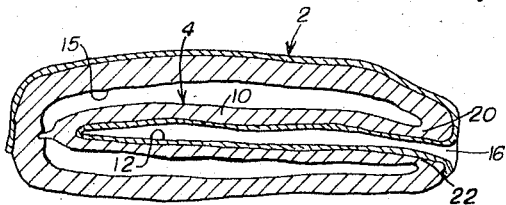
FIG. 5 is a cross-sectional view of the breast with the wing inserted therein, as seen along line 5—5 in FIG. 4.

As shown in FIG. 4, this exposes the opening 16 so that stuffing may be inserted therethrough. The resultant disposition of the portions of the wing and breast may best be understood by referring to FIG. 5. The wing 4, flesh side out, forms a pocket or sack within the confines of the breast. At a portion of the juncture of the wing and breast, they are connected at 20 and 22. Of course, other sectional views taken along lines close to the line 5—5 in FIG. 4 will show a discontinuity between the breast and wing flesh.

Figure 6:
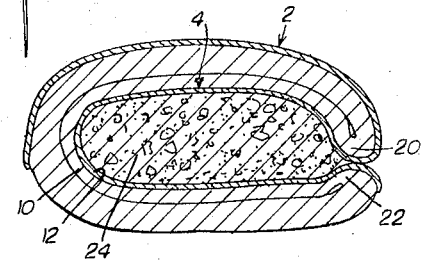
FIG. 6 is a view similar to FIG. 5, showing a stuffing material within the breast.

As shown in FIG. 6, a suitable stuffing material 24 is then inserted into the wing cavity through the opening 16. The product is then cooked by any method desired, and served.

If desired, the wing may be again turned inside out so that the wing skin is on the outside, prior to insertion of the wing into the breast. In this case, the incision 13 is preferably made on the skin side of the breast.

From the above, it will be seen that the objects of the invention have been satisfied, and that a most versatile and palatable food product has been produced.

The scope of the invention is not limited only to the exact embodiments described above, but is clearly set forth in the following claims.

I claim:
1. The method of preparing a fowl product including a deboned fowl breast and wing comprising the steps of: removing the bones from the wing while leaving the flesh portions thereof substantially unsevered to form a generally tubular wing portion, making an incision in the breast proximate to the juncture of the wing and breast, cutting through said incision to form a cavity within said breast, and inserting said wing end first into said breast cavity.

2. The method of claim 1 including the step of filling said wing cavity with a stuffing material.

3. The method of claim 1 including the step of inverting the wing flesh by turning it inside out.

4. A food product including a deboned fowl wing and deboned fowl breast, said wing having its outer portion substantially unsevered, an internal cavity in said wing, an opening proximate to the juncture of the wing and breast extending into the breast to define a cavity therein, said wing extending through said opening and lying within the cavity within said breast.

5. The food product of claim 4 having a stuffing material within said wing cavity.

References Cited by the Examiner

UNITED STATES PATENTS

| 2,844,844 | 7/1958 | Sieczkiewicz | 99—107 X |
| 2,853,389 | 9/1958 | Luchese | 99—107 |
| 3,006,766 | 10/1961 | Zolezzi et al. | 99—107 |

OTHER REFERENCES

Lord, "Everybody's Cook Book" 1924, published by Henry Holt and Company, New York, page 499.

RAYMOND N. JONES, *Primary Examiner.*

HYMAN LORD, A. LOUIS MONACELL, *Examiners.*